Aug. 9, 1960  R. E. FISCHER  2,948,189
REFLECTING TELESCOPE WITH INTERCHANGEABLE OPTICAL SYSTEMS
Filed April 6, 1959  2 Sheets-Sheet 2

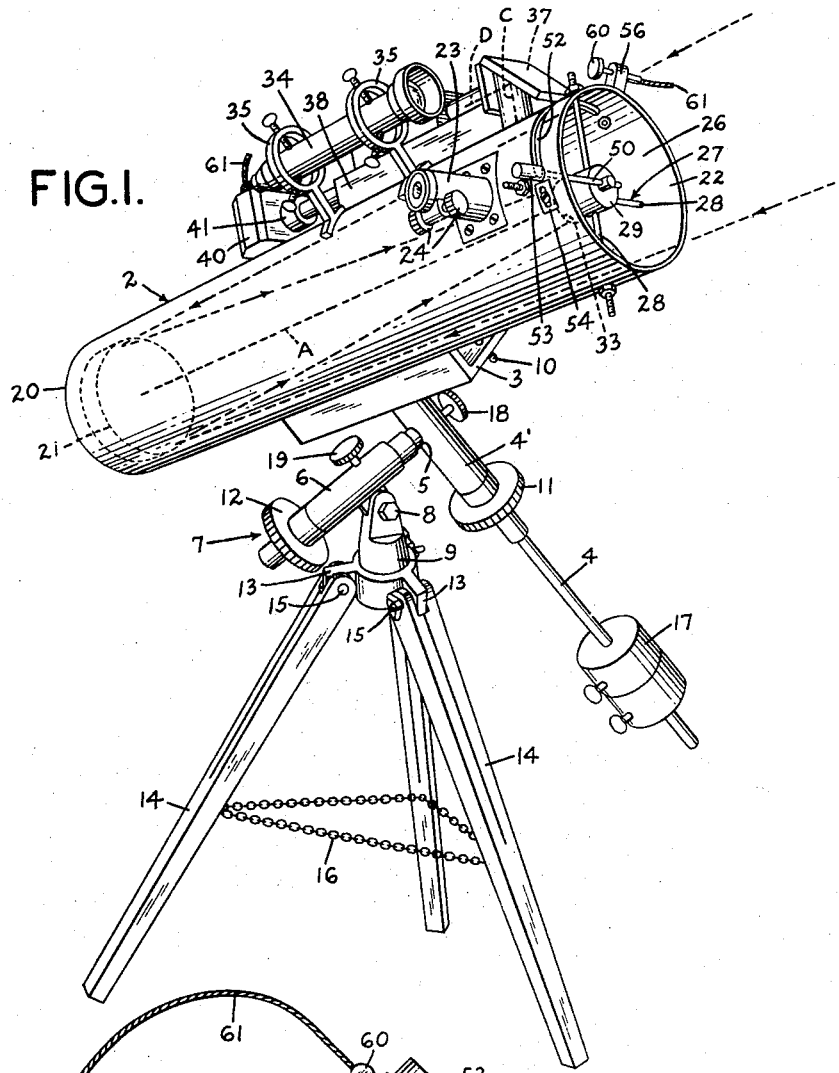

INVENTOR
ROBERT E. FISCHER
BY
Andrew Kafko
HIS ATTORNEY

United States Patent Office 2,948,189
Patented Aug. 9, 1960

2,948,189

REFLECTING TELESCOPE WITH INTERCHANGEABLE OPTICAL SYSTEMS

Robert E. Fischer, 72—10 112th St., Forest Hills, N.Y.

Filed Apr. 6, 1959, Ser. No. 804,448

5 Claims. (Cl. 88—32)

This invention relates generally to telescopes, and more particularly to reflecting telescopes that conventionally comprise a concave reflecting mirror as objective, a plane reflecting mirror, and an eye-piece optical system.

The present invention is specifically directed to the type of reflecting telescopes known as Newtonian. Conventionally, such telescopes comprise a tube or cylindrical housing that is open at one end; as the objective, a comparatively large concave mirror that is located at the opposite end of the housing, and is positioned to face the open end thereof; and an eye-piece optical system mounted on the body of the housing and directed at a 90 degree angle thereto. In accordance with prior practice, there is fixedly mounted within the housing at a 45 degree angle to and in intersection with the optical axes of the eye-piece optical system and of the concave mirror objective, respectively, a comparatively small plane mirror. The small plane mirror is fixed in said relationship to each of said optical axes by means of a spider mounting within the housing. The spider mounting provides minimum interference to light traversing the housing from the open end thereof past the plane mirror to impinge upon and be reflected by the larger concave mirror back to the reflecting surface of the smaller inclined mirror and thence to the eye-piece optical system, where the image is viewed. Also conventionally, the telescope may be provided with a smaller telescope of the refracting type that has lesser magnification than the main reflecting telescope and is mounted on the housing of the main telescope in alignment with the major optical axis of the latter. With this arrangement, the refracting telescope may be used as a sighting means for more easily picking out the celestial body or other object to be studied by the reflecting telescope.

Users of reflecting telescopes of the type described, whether they be of substantially amateur status or more seriously concerned with viewing celestial bodies or other objects, have found it desirable to record their viewings by directly photographing the same, and/or to study the light received from such bodies by means of recording and/or analyzing devices; e.g. spectroscopes, spectrographs and the like, with or without the additional use of cameras. As has been customary with established observatories for decades, such devices are mounted on the telescopes as desired. However, reflecting telescopes employed by the aforementioned users of amateur or more serious status, have not been suitably adapted for permitting use therewith of such recording devices and/or analyzing devices in a facile and effective manner.

For example, when a reflecting telescope of the type to which the present invention is directed, is used, the object to be studied is first found by means of the refracting telescope and thereafter studied more minutely by means of the greater magnification afforded by the reflecting telescope. However, when it is desired to record what is being viewed, as by a photograph of the image, or alternatively a photograph of the spectrum afforded by a spectrographic analysis of the light from the body, or merely to view the pattern afforded by a spectroscope; it is necessary first to remove the eye-piece optical system and then to mount on the housing of the telescope instead either a camera for photographing the image viewed or a spectroscope or a combination spectroscope and camera, if recording a spectroscopic study.

The disadvantages of such operations will immediately become obvious. In the first place, there is the intrinsic disadvantage of the extra time and effort involved in removal of the eye-piece objective and replacement by one of the optical devices or combinations referred to. More important than this physical inconvenience are the technical inconveniences inherent therein. Specifically, with reflecting telescopes of any appreciable magnifying power at all, the optical field thereof traverses the celestial or other object originally contained therein, in a matter of seconds, due to normal displacement caused by the rotation of the earth, and/or movement of the object. Moreover, particularly in smaller and lighter devices, serious physical displacements are caused by the attachment of the comparatively heavier optical devices such as spectroscope and camera. Larger and/or expensive reflecting telescopes compensate for the rotational movement of the earth by elaborate clockdrive mechanisms whereby the telescope follows the object originally sighted for longer periods of time, so that some time is permitted for the attachment of the desired optical devices in place of the eye-piece viewing system. However, other reflecting telescopes, such as those generally used by the amateur and even more serious observers, usually have no such compensating mechanism and, even if they are so equipped, the aforesaid physical displacement in attaching the optical devices is quite likely. Moreover, the nuisance of attaching and detaching of the optical devices and eye-piece optical system, presents problems of its own, as referred to hereinbefore. Additionally, during the time it takes for replacement, and assuming the reflecting telescope still has the object in its field, other objects may come within the line of sight to interfere with photographic and/or spectroscopic study. For example, clouds or other atmospheric disturbances or other objects may come within the line of sight during the interim between the original sighting and the replacement of the eye-piece optical system with the optical device chosen.

With the foregoing problems and disadvantages and deficiencies of the prior art practices and devices in this field in mind, it is a primary object of the present invention to provide reflecting telescopes with a means for interchanging the eye-piece optical system with other optical systems permanently mounted on the housing of the telescope.

It is another object of the invention to provide reflecting telescope combinations as referred to above with a minimum alteration of the basic structure of conventional reflecting telescopes.

Yet another object of the present invention is to provide reflecting telescopes as described above that afford the aforesaid functions by simple manipulation of an operating means located on the housing of the telescope in the region of the eye-piece.

It is yet another object of the present invention to provide reflecting telescopes of the type described above that have interchangeable optical systems and means for selecting a desired one with no substantial additional obstruction to light traversing the housing of the telescope past the usual spider structure, than is caused by the latter, in either or any of the operative positions of the optical systems.

Another object of the present invention is to provide a reflecting telescope as described above, and which also includes a camera, with additional means whereby positioning of the operating means to select a chosen optical device for functioning in the system, also automatically trips the shutter mechanism of the camera immediately after the optical device has been optically connected to the optical system of the reflecting telescope.

Still another object of this invention is to provide reflecting telescopes as described above wherein the position of the operating means functions to select the optical device chosen and also indicates which optical device is operative at a given time.

With the foregoing and other objects in view, the invention resides in the novel arrangement and combination of parts and in the details of construction, hereinafter described and claimed, it being understood that changes in the various precise embodiments of the invention herein described may be made within the scope of what is claimed without departing from the spirit of the invention.

It will be further understood that my invention is susceptible of embodiment in many and various forms, some of which are illustrated in the accompanying drawings, and that the structural details and modes of assembly herein set forth may be varied and interchanged to suit particular purposes and still remain within my inventive concept.

The invention will be more clearly understood from a consideration of the following description taken in connection with the accompanying drawings that form a part of this specification. In such drawings, wherein like numerals identify like parts in the several embodiments and views thereof:

Fig. 1 is a perspective view of a reflecting telescope of Newtonian design to which an optical assembly, comprising in this case a spectoscope and a camera optically connected thereto, has been permanently affixed in addition to the eye-piece optical system and which is provided with selectively operable interchanging means in accordance with one embodiment of the present invention;

Fig. 2 is a side elevational view of the upper end of a Newtonian reflecting telescope similar to that shown in Fig. 1, but with the spectroscope-camera assembly replaced by a camera alone;

Figure 3:
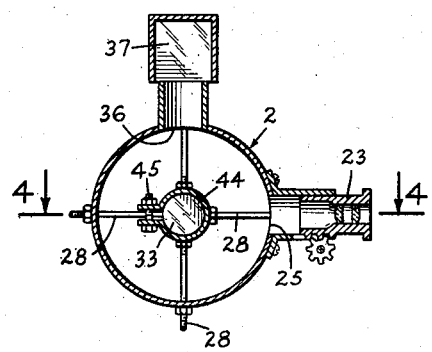
Fig. 3 is a cross-section of the upper end of the reflecting telescope shown in Fig. 2 taken along section line 3—3 thereof.

Referring now to Fig. 1 of the drawing, a reflecting telescope of the type to which the present invention particularly applies, comprises a cylindrical housing 2 supported by means of an equatorial mount 7 of conventional design. Equatorial mount 7 comprises a cradle support 3 to which housing 2 is attached by means of screw assemblies 10. Cradle support 3 has affixed thereto for rotation therewith a shaft 4 that extends through and is rotatable in a tube 4'. Tube 4' in turn has affixed to the side thereof a second shaft 5 mounted for rotation in a second tube 6. Shafts 4 and 5 have attached thereto for rotation therewith, respectively, setting circles 11 and 12, whereby the telescope may be set in accordance with star maps as is well known in the art.

Tube 6 is in turn mounted for pivoting on a horizontal axis on bolt 8 that is carried by bearing assembly 9. Bearing assembly 9 has affixed to the outside periphery thereof three lugs 13. Lugs 13 function as attachment means to which three legs 14, bifurcated at their upper portions as shown, are pivotally connected by bolts 15. Chain 16 restricts the outward pivotal movement of legs 14 on their bolts 15. Counterweights 17 are provided on shaft 4 to facilitate pivoting or rotation of housing 2, on shaft 5. Locking knobs 18 and 19 are provided for fixing shaft 4 and shaft 5, respectively, in any selected rotative relationship of the latter in their respective tubes 4' and 6.

Cylindrical housing 2 has mounted therein at one end 20 thereof a large concave reflecting mirror 21 (indicated by dotted lines) having the reflecting surface thereof facing the upper open end 22 of housing 2. An eye-piece viewing system 23 equipped with the usual focus adjustment means 24 is mounted on the outer periphery of the upper end 22 of cylindrical housing 2, over an aperture 25 therein (shown in Figs. 3 and 4).

Figure 4:
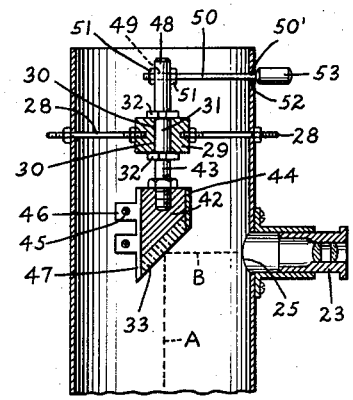
Fig. 4 is a cross-section of the upper end of the reflecting telescope shown in Figs. 2 and 3 taken along section line 4—4 thereof.

To complete the usual arrangement for this type of telescope there is provided on the interior surface 26 of the upper end 22 of cylindrical housing 2, a spider support 27 that comprises a plurality of rigidly disposed rods 28, which, as best seen in Fig. 4 support a hub 29 centrally of the interior of cylindrical housing 2. Hub 29 has a bearing aperture 30, through which protrudes a rotatable shank 31 fixed against lateral displacement through aperture 30 by means of split ring washers 32. Supported by hub 29, by means in accordance with the present invention that will be described in detail hereinafter, is a small inclined plane reflecting mirror 33. Plane reflecting mirror 33 is supported in position to intersect both the optical axis A of concave reflecting mirror 22 and the optical axis B of eye-piece viewing system 23, as best seen in Fig. 4.

Also included, in conventional manner, is a refracting telescope 34 that is mounted on cylindrical casing 2 by means of brackets 35 which support refracting telescope 34 with the optical axis thereof in substantially parallel relationship to the optical axis A of large concave reflecting mirror 21. In this manner, refracting telescope 34 of lesser power may be utilized as a sighting means for the main reflecting telescope of much higher power, as is well known in the art.

In accordance with the present invention, a second aperture 36 (shown in Fig. 3) is provided circumferentially displaced from first aperture 25. As seen in Fig. 1, an inclined plane reflecting mirror 37 is supported on cylindrical housing 2 over aperture 36 to reflect the light that passes outwardly therethrough, along optical axis C, rearwardly along optical axis D, to the light-sensitive device to be utilized, that has been affixed to housing 2. For illustrative purposes, there is shown in Fig. 1 a spectroscope 38, into the slit (not shown) of which, light traveling along axis D, enters. A camera 40 is mounted behind spectroscope 38 with the lens 41 attached to the rear of spectroscope 38 for photographing the spectrum formed in the former.

Figure 5:
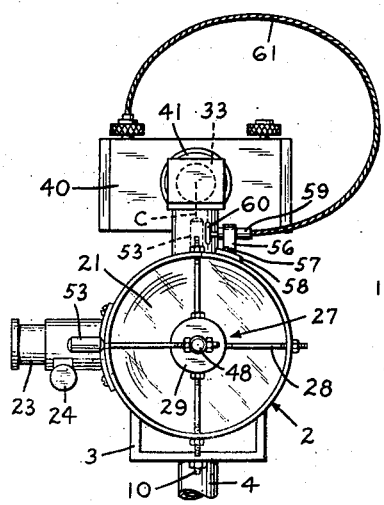
Fig. 5 is an end view of the upper open end of the reflecting telescope shown in Figs. 2–4.

It will be understood that spectroscope 38 and camera 40 shown in Fig. 1 may be detachably mounted on housing 2 by conventional attachment means (not visible in Fig. 1) whereby camera 40 may be removed for permitting visual examination of the spectrum formed in spectroscope 38, or the installation of some other light-sensitive device. Similarly, spectroscope 38 may be replaced by camera 40 to permit photographing of the image that is reflected by plane mirror 37, as illustrated in Figs. 2 and 5. Alternatively, any other light-sensitive device or devices may replace either spectroscope 38 or camera 40 or both of them, as will be understood by those skilled in the art.

In the specific embodiment of the invention illustrated in Figs. 1–5, the means for mounting plane reflecting mirror 33 on hub 29 that is in turn supported by spider arms 28, comprises a block base 42 that is screw-threadably affixed to the lower end 43 of rotatable shank 31 (as viewed in Fig. 4) for rotation therewith. Block base 42 is encompassed by a split clamping sleeve 44 that is retained in clamping engagement with the former and with plane reflecting mirror 33 by means of screws 45 in opposed ears 46 provided on the adjacent edges 47 of split clamping sleeve 44. As shown, the lower end of block base 42 is cut at an angle (substantially 45°) to the main axis thereof, and mirror 33 is retained thereagainst, at the same angle, by clamping sleeve 44.

Rotatable shank 31 is provided at its upper end 48 (as viewed in Fig. 4) with an aperture 49 through which protrudes a shaft 50 that is held against lateral movement through aperture 49 by means of opposed nuts 51. Cylindrical housing 2 is provided with a circumferential slit 52 through which the outer end 50' of shaft 50 protrudes and has a handle 53 mounted thereon. Located at either end of slit 52 is a slotted washer 54 retained in selected position along slit 52 by means of an assembly 55, whereby the extent of travel of shaft end 50' along slit 52 may be selectively limited. Preferably, screw and nut assemblies 55 are mounted in separate apertures (not shown) that are positioned in line with but beyond the extent of circumferential slit 52 to provide individual seatings for said screw and nut assemblies 55.

In the preferred arrangement of the foregoing embodiment of the invention, the parts, and particularly optical apertures 25, 36, mirror 33, spider rods 28, and shaft 50 and washers 54, are arranged so that in either selection of eye-piece optical system 19 or light-sensitive optical device 38 and/or 40, shaft 50 overlies one or another spider rods 28 in a plane substantially parallel to that of the main axis (and optical axis A) of the reflecting telescope, whereby minimum obstruction to light passing down housing 2 to mirror 21 is afforded.

In accordance with an important feature of the invention, means are provided for automatically tripping the shutter mechanism of camera 40 at the time of selective optical connection thereof into the reflecting telescope optical system, provided camera 40 is included in the assembly as disclosed in Figs. 1–5.

Such means comprise a bracket 56 affixed to cylindrical housing 2 by means of screws 57. Slots (not shown) are provided in the base 58 of bracket 56 to permit limited adjustment circumferentially of housing 2 for a purpose that will appear presently. Bracket 56 carries sleeve 59 in which is mounted plunger 60 and to which is connected flexible cable 61 of camera 40 for activation of the shutter-mechanism thereof. Bracket 56 is positioned on housing 2 so that movement of shaft 50 by means of handle 53 from the position shown in Figs. 1–5 to the extreme position (shown in dotted lines in Fig. 5) in circumferential slit 52 determined by adjustable washer 54, results in engagement of handle 53 with plunger 60. Thus, the shutter mechanism of camera 40 is actuated at the time mirror 33 is rotated to the position on optical axis A where it also intersects optical axis C.

The operation of the reflecting telescope that includes an embodiment of the present invention, will be obvious from the structure and arrangement just described, and may comprise the following:

The reflecting telescope, movable on equatorial mount 7, is first aimed at the celestial body or other object to be studied, by means of refracting telescope 34 as referred to hereinbefore. After the object is sighted generally through refracting telescope 34, the particular object or portion thereof is then selected, focused, and viewed by eye-piece viewing system 23. Immediately upon the user deciding what is seen is desired to be recorded, whether photographically, or spectrographically, or otherwise, shaft 50 is swung by means of handle 53 from the position shown in Figs. 1–5 in which the reflecting surface of plane reflecting mirror 33 intercepts the optical axis B of eye-piece viewing system 23 to the position limited by washer 54 at the other end of slit 52, where the inclined surface of the reflecting mirror 33 intercepts the optical axis C of the light-sensitive optical device 38 and/or camera 40.

When camera 40 is either included or used as the light-sensitive optical device, the shutter mechanism thereof is tripped immediately after proper alignment of reflecting mirror 33 with the optical axis C thereof by handle 53 pushing plunger 60 to the right as viewed in Fig. 5.

Figure 6:
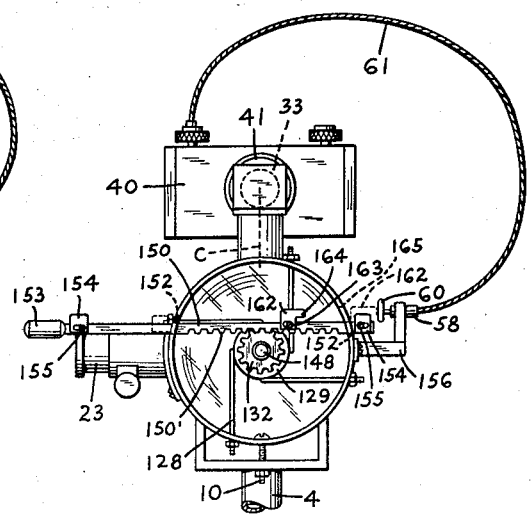
Fig. 6 is an end view of the upper open end of a reflecting telescope similar to that shown in Figs. 2–5 but with another embodiment shown.

In another embodiment of the invention applied to a reflecting telescope having a structure similar to that disclosed in Figs. 1–5, the means for rotating shaft 31 which carries mounting assembly 42—47 for reflecting mirror 33 comprises, instead of shaft 50 (and handle thereon) protruding through the slit 52; a gear and ratchet mechanism that, as shown in Fig. 6, comprises a gear 132 mounted on shank 148 for rotation therewith, instead of split-ring washer 32 and a ratchet rod 150 mounted for longitudinal movement by means of handle 153, through opposed apertures 152 in cylindrical housing 2 with the teeth 150' thereof meshing with those of gear 132. Preferably, rod 150 carries adjustably mounted stop-limit means comprising sleeve members 154 that may be slid longitudinally of ratchet rod 150 and affixed in selected positions by means of set screws 155, and which function to abut the outer surface of housing 2 in extreme positions of ratchet rod 150, as shown in full and in dotted lines respectively, in Fig. 6.

To minimize the amount of light obstructed by the structures within cylindrical housing 2 from passing to concave mirror 21 at the closed end of housing 2, as accomplished by the arrangement in Figs. 1–5; spider arms 128 of spider mounting 127 are arranged substantially tangent to hub 129 they support. By such arrangement, rod 150 may be mounted to extend in a plane that extends parallel to the main axis of housing 2, and passes through one of spider arms 128.

For the purpose of permitting automatic actuation of a camera upon positioning of the inclined plane mirror (not visible) to reflect light along axis C, the plunger 60 of flexible cable 61 is mounted by means of bracket 156 to be located in the path of a lug 162 adjustably mounted on rod 150 by means of set screw 163. Stop member 154 at the left end of ratchet rod 150 (as viewed in Fig. 6) and lug 162 are positioned on rod 150 so that when rod 150 is moved to the extreme right to align mirror 33 with optical axis C, the end 164 of lug 162 protrudes through another aperture 165 in housing 2 in offset relationship to aperture 152 to push plunger 60 in for actuating the camera shutter-mechanism.

From the above description, it is thought that the various embodiments and advantages of my invention will be readily apparent to those skilled in the art, as well as the possibility of interchanging certain features of specific embodiments with those of other embodiments with or without modification. Various changes in details of the embodiments shown may also be made without departing from the spirit or losing the primary advantages of the invention as will also be understood. For example, instead of a light-sensitive device or devices as second optical system, there may be substituted another optical viewing system of different power than that already installed, or the telescope may be equipped with additional means to permit rotation of the plane reflecting mirror to a plurality of positions rather than the two illustrated, whereby there may be selection of one of the more than two optical systems that may then be carried on the telescope housing 2.

I claim:

1. A reflecting telescope, comprising a cylindrical housing, a large concave reflecting mirror mounted in said housing at one end thereof and having the reflecting surface thereof facing the other end of said housing, said housing having a first aperture in the region of said other end thereof, said housing having a second aperture that is displaced circumferentially thereon from the first aperture, an eye-piece viewing system mounted on said housing and having the optical axis thereof directed through the first aperture, a camera and shutter-actuating mechanism therefor likewise mounted on said housing and having the optical axis thereof directed through the second aperture, a small plane reflecting mirror supported by mounting means within said housing to intersect the optical axis of said concave reflecting mirror at an angle thereto, said small plane mirror and said mounting means presenting no substantial obstruction to light that passes into said housing through the open end thereof to said large concave mirror, said mounting means comprising a plurality of rods mounted on said cylindrical housing and extending inwardly to form a spider support and rotatable means carried by said spider support and fixedly attached to said small plane reflecting mirror for rotative movement therewith, said spider support and rotatable means carried thereby being so constructed and arranged that said small plane reflecting mirror may be rotated on said optical axis of said large concave reflecting mirror to a first position wherein it intersects said optical axis of said eye-piece viewing system, and to a second position on said optical axis of said large concave mirror wherein it intersects said optical axis of said camera, and operating means for rotating said rotatable means and said small plane mirror affixed thereto, said operating means comprising a member operatively connected to said rotatable means and having an end thereof extending through an opening in said housing, said member being positioned in substantially the same radial plane as is at least one of said rods of said spider support when said small plane mirror is in either of said first and second positions, and means for tripping said shutter-actuating mechanism of said camera, said last-named means being actuated upon movement of said operating means to the position wherein said plane reflecting mirror is rotated to said second position.

2. A reflecting telescope, comprising a cylindrical housing, a large concave reflecting mirror mounted in said housing at one end thereof and having the reflecting surface thereof facing the other end of said housing, said housing having a first aperture in the region of said other end thereof, said housing having a second aperture that is displaced circumferentially thereon from the first aperture, an eye-piece viewing system mounted on said housing and having the optical axis thereof directed through the first aperture, a camera and shutter-actuating mechanism therefor likewise mounted on said housing and having the optical axis thereof directed through the second aperture, a small plane reflecting mirror supported by mounting means within said housing to intersect the optical axis of said concave reflecting mirror at an angle thereto, said small plane mirror and said mounting means presenting no substantial obstructions to light that passes into said housing through the open end thereof to said large concave mirror, said mounting means comprising a plurality of radially arranged rods forming a spider support and rotatable means carried by said spider support and fixedly attached to said small plane reflecting mirror for rotative movement therewith, said spider support and rotatable means carried thereby being so constructed and arranged that said small plane reflecting mirror may be rotated on said optical axis of said large concave reflecting mirror to a first position wherein it intersects said optical axis of said eye-piece viewing system, and to a second position on said optical axis of said large concave mirror wherein it intersects said optical axis of said camera, and operating means for rotating said rotatable means and said small plane mirror affixed thereto, said operating means comprising a shaft having one end thereof affixed to said rotatable means and extending at a right angle to the axis of rotation of said rotatable means and through a slit extending circumferentially of said housing, and of a length that is equivalent to the distance between the outer ends of two of said rods of said spider support, said shaft, said rotating means, said small plane mirror, said two rods, said first and second apertures, and said optical axes of said eye-piece viewing system and said camera being so constructed and arranged that upon rotation of said small plane mirror to said first position by movement of said shaft in said slit, said shaft is positioned in substantially the same radial plane as is one of said two rods of said spider support, and upon rotation of said small plane mirror to said second position by movement of said shaft in said slit, said shaft is positioned in substantially the same radial plane as the other of said two rods of said spider support, and means responsive to movement of said shaft to the position along said slit wherein said plane reflecting mirror is rotated to said second position, for tripping said shutter-actuating mechanism of said camera.

3. A reflecting telescope as claimed in claim 2, wherein adjustable stop means are positioned athwart the circumferential slit for limting the lateral movement therein of said shaft.

4. A reflecting telescope, comprising a cylindrical housing, a large concave reflecting mirror mounted in said housing at one end thereof and having the reflecting surface thereof facing the other end of said housing, said housing having a first aperture in the region of said other end thereof, said housing having a second aperture that is displaced circumferentially thereon from the first aperture, an eye-piece viewing system mounted on said housing and having the optical axis thereof directed through the first aperture, a light-sensitive optical device likewise mounted on said housing and having the optical axis thereof directed through the second aperture, said light-sensitive optical device comprising a camera and shutter-actuating mechanism therefor, a small plane reflecting mirror supported by mounting means within said housing to intersect the optical axis of said concave reflecting mirror at an angle thereto, said small plane mirror and said mounting means presenting no substantial obstruction to light that passes into said housing through the open end thereof to said large concave mirror, said mounting means comprising a plurality of radially arranged rods forming a spider support and rotatable means carried by said spider support and fixedly attached to said small plane reflecting mirror for rotative movement therewith, said spider support and rotatable means carried thereby being so constructed and arranged that said small plane reflecting mirror may be rotated on said optical axis of said large concave reflecting mirror to a first position wherein it intersects said optical axis of said eye-piece viewing system, and to a second position on said optical axis of said large concave mirror wherein it intersects said optical axis of said light-sensitive device that comprises said camera and said shutter-actuating mechanism, and operating means for rotating said rotatable means and said small plane mirror affixed thereto, said operating means comprising a shaft having one end thereof affixed to said rotatable means and extending at a right angle to the axis of rotation of said rotatable means and through a slit extending circumferentially of said housing, said shaft, said rotating means, said small plane mirror, and two of said plurality of rods, said first and second apertures and said optical axes of said eye-piece viewing system and said camera being so constructed and arranged that upon rotation of said small plane mirror to said first position by movement of said shaft in said slit, said shaft is positioned in substantially the same radial plane as is one of said two rods of said spider support, and upon rotation of said small plane mirror to said second position by movement of said shaft in said slit, said shaft is positioned in substantially the same radial plane as the other of said two rods of said spider support, and means responsive to movement of said shaft to the position along said slit wherein said plane reflecting mirror is rotated to said second position, for tripping said shutter-actuating mechanism of said camera.

5. A reflecting telescope, comprising a cylindrical housing, a large concave reflecting mirror mounted in said housing at one end thereof and having the reflecting surface thereof facing the other end of said housing, said housing having a first aperture in the region of said other end thereof, said housing having a second aperture that is displaced circumferentially thereon from the first aperture, an eye-piece viewing system mounted on said housing and having the optical axis thereof directed through the first aperture, a camera with shutter-actuating mechanism therefor likewise mounted on said housing and having the optical axis thereof directed through the second aperture, a small plane reflecting mirror supported by mounting means within said housing to intersect the optical axis of said concave reflecting mirror at an angle thereto, said small plane mirror and said mounting means presenting no substantial obstruction to light that passes into said housing through the open end thereof to said large concave mirror, said mounting means comprising a plurality of rods extending across and mounted within said cylindrical housing and forming a spider support and rotatable means carried by said spider support and fixedly attached to said small plane reflecting mirror for rotative movement therewith, said spider support and rotatable means carried thereby being so constructed and arranged that said small plane reflecting mirror may be rotated on said optical axis of said large concave reflecting mirror to a first position wherein it intersects said optical axis of said eye-piece viewing system, and to a second position on said optical axis of said large concave mirror wherein it intersects said optical axis of said camera, and operating means for rotating said rotatable means and said small plane mirror affixed thereto, said operating means comprising a shaft having teeth along one edge thereof that are held by sleeve means in meshing engagement with gear teeth circumferentially positioned on said rotatable means, said shaft being of a length so that at least one end thereof protrudes through one of two opposed apertures in said housing in either of said first and said second positions of said small plane reflecting mirror said toothed shaft being mounted to move longitudinally in substantially the same radial plane as is one of said plurality of rods, and means responsive to movement of said shaft to the position protruding through one of said opposed apertures wherein said plane reflecting mirror is rotated to said second position, for tripping said shutter-actuating mechanism of said camera.

References Cited in the file of this patent

UNITED STATES PATENTS

| | | |
|---|---|---|
| 2,003,171 | Burrell | May 28, 1935 |
| 2,282,869 | Johnson et al. | May 12, 1942 |
| 2,586,973 | McMillin | Feb. 26, 1952 |
| 2,651,969 | Thor | Sept. 15, 1953 |